Oct. 18, 1938.   O. H. JENSEN   2,133,542
CUT-OFF MACHINE
Filed June 10, 1935   6 Sheets-Sheet 6
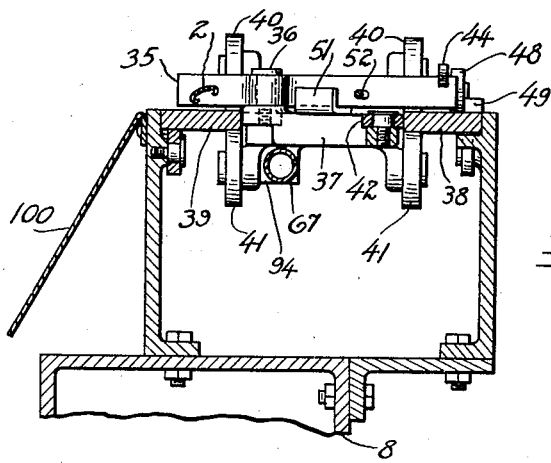
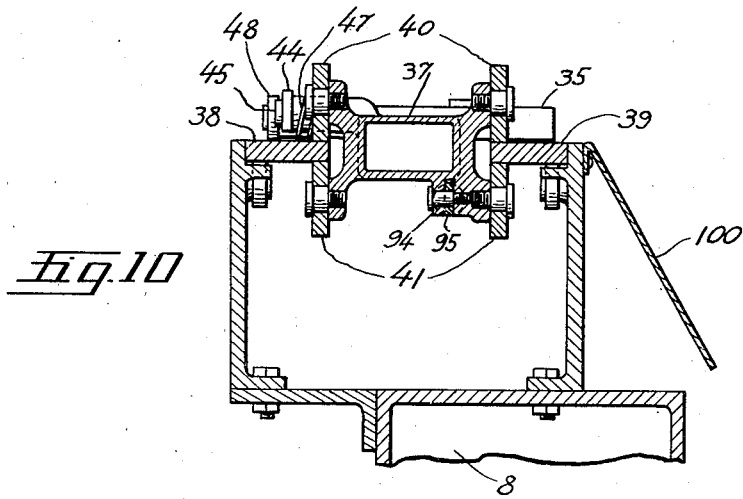
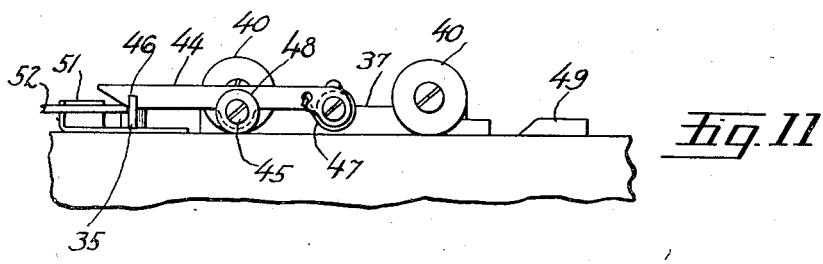
INVENTOR
*Otto H. Jensen*
BY
Barnes, Kisselle, Laughlin and Raisch
ATTORNEYS Patented Oct. 18, 1938

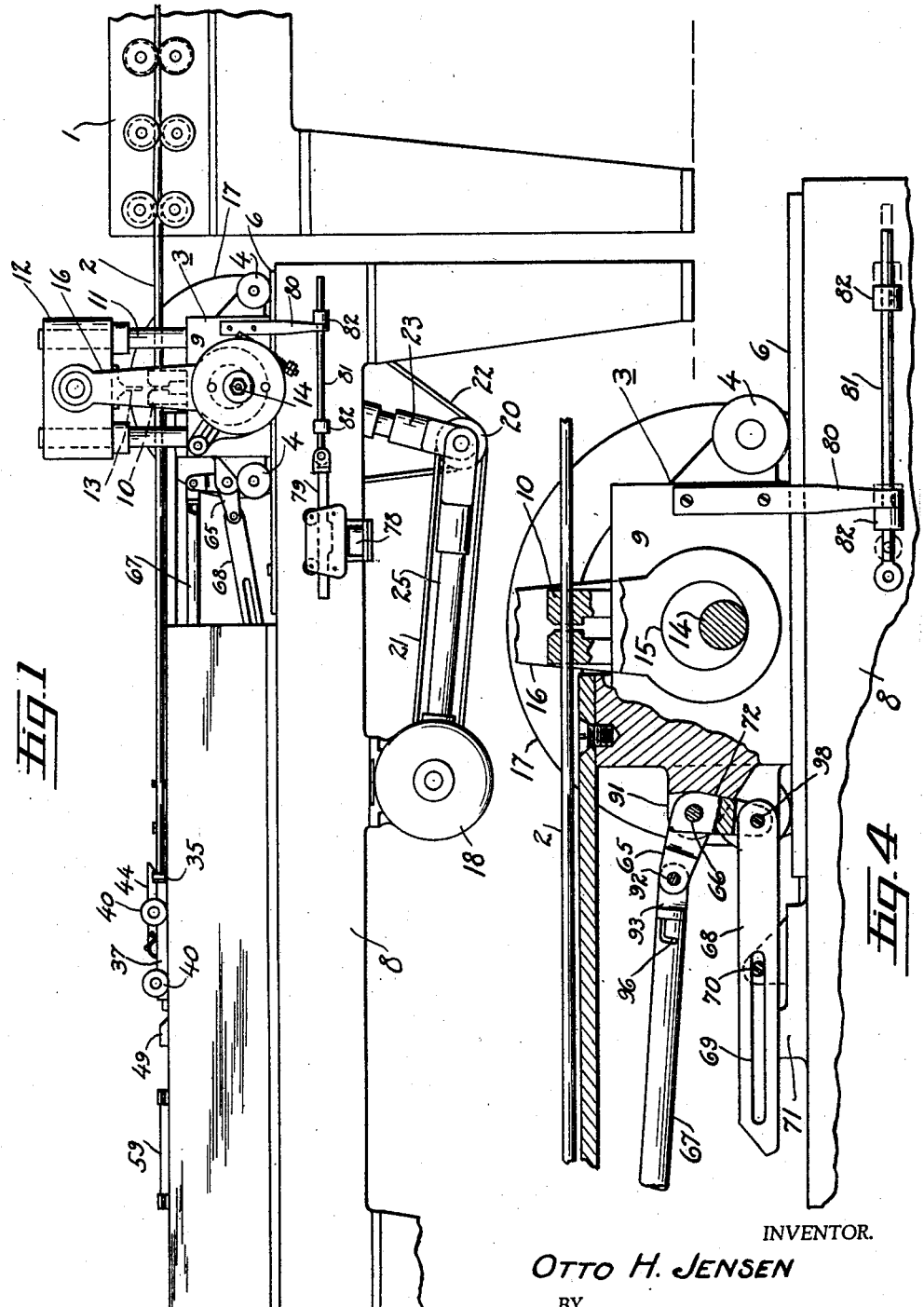

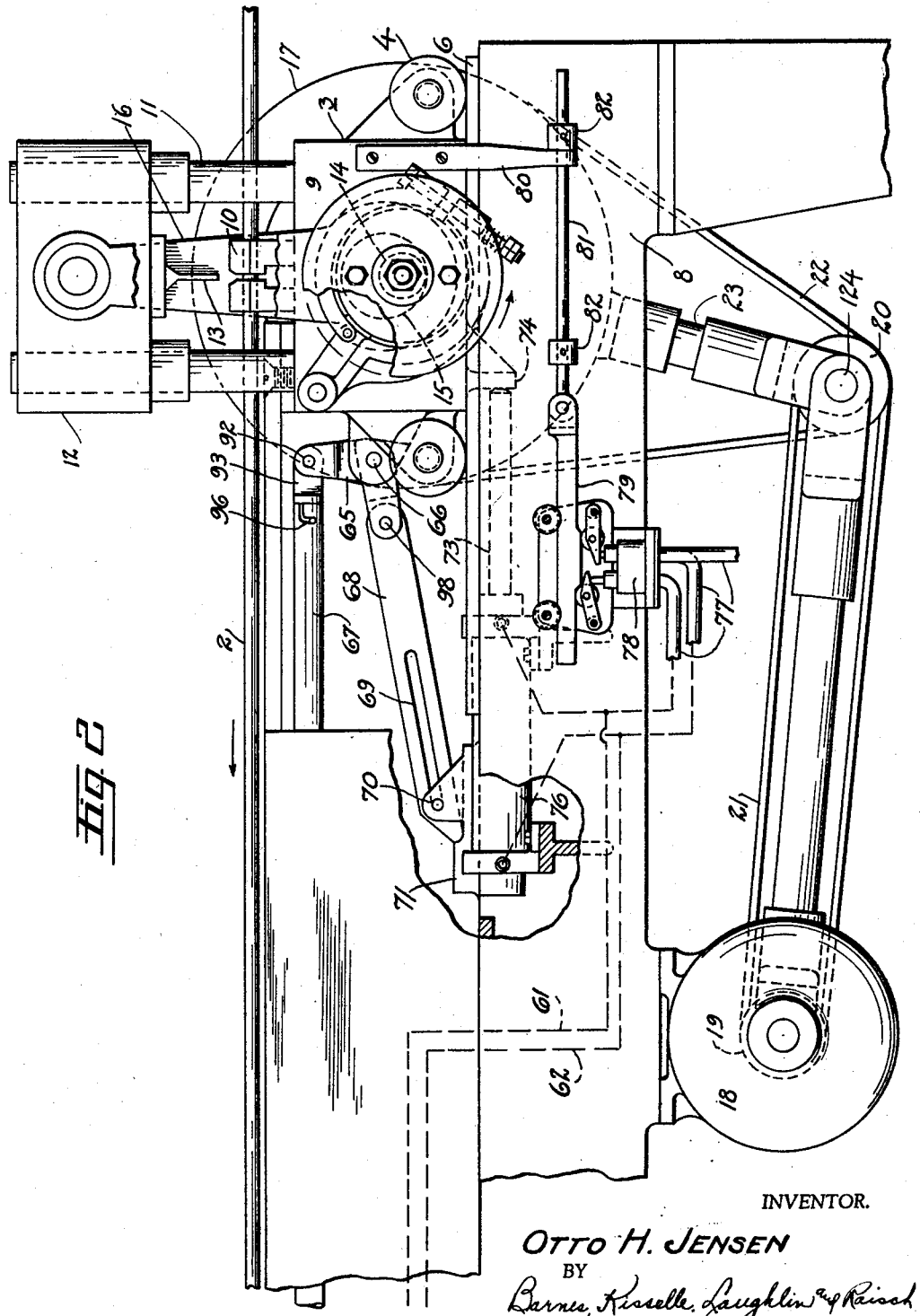

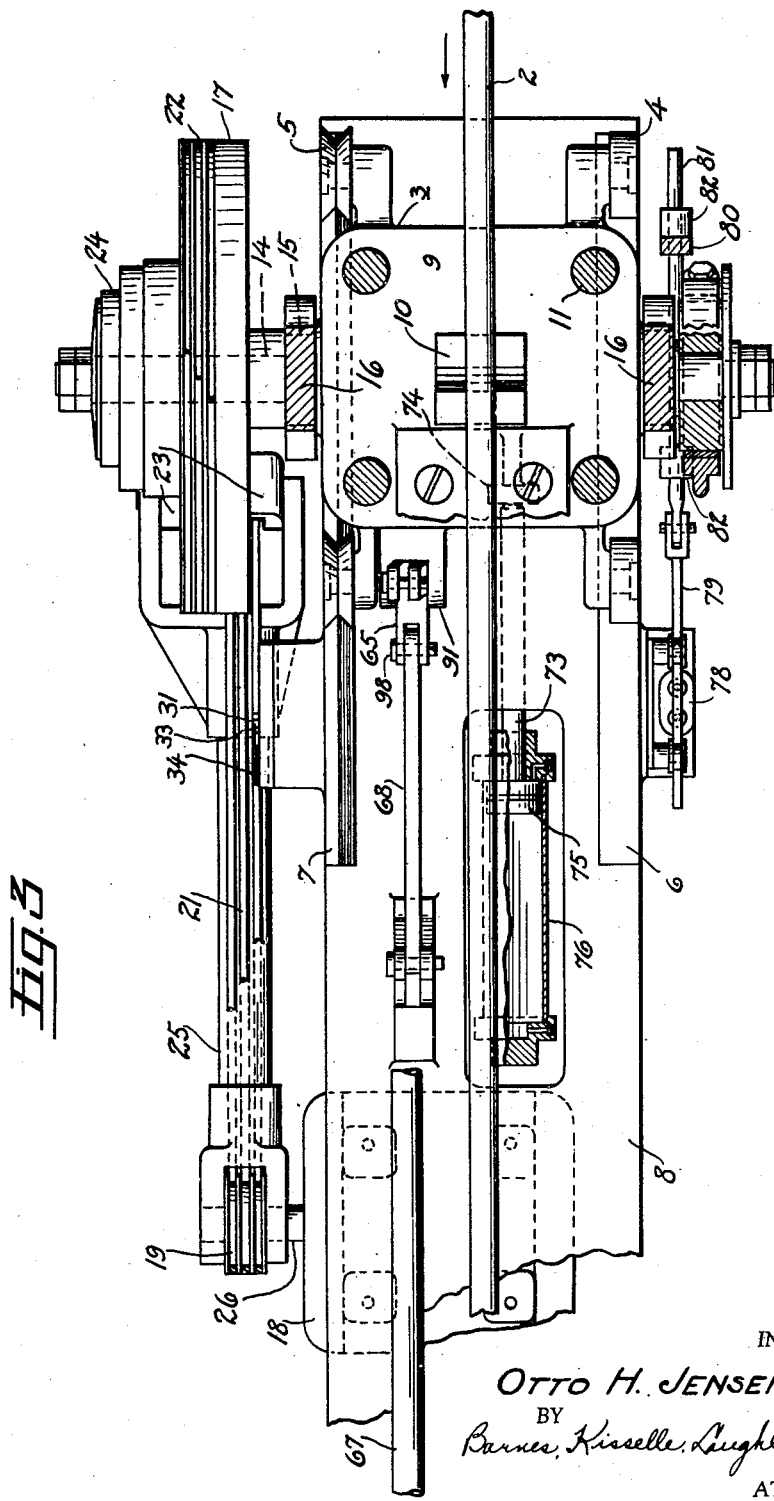

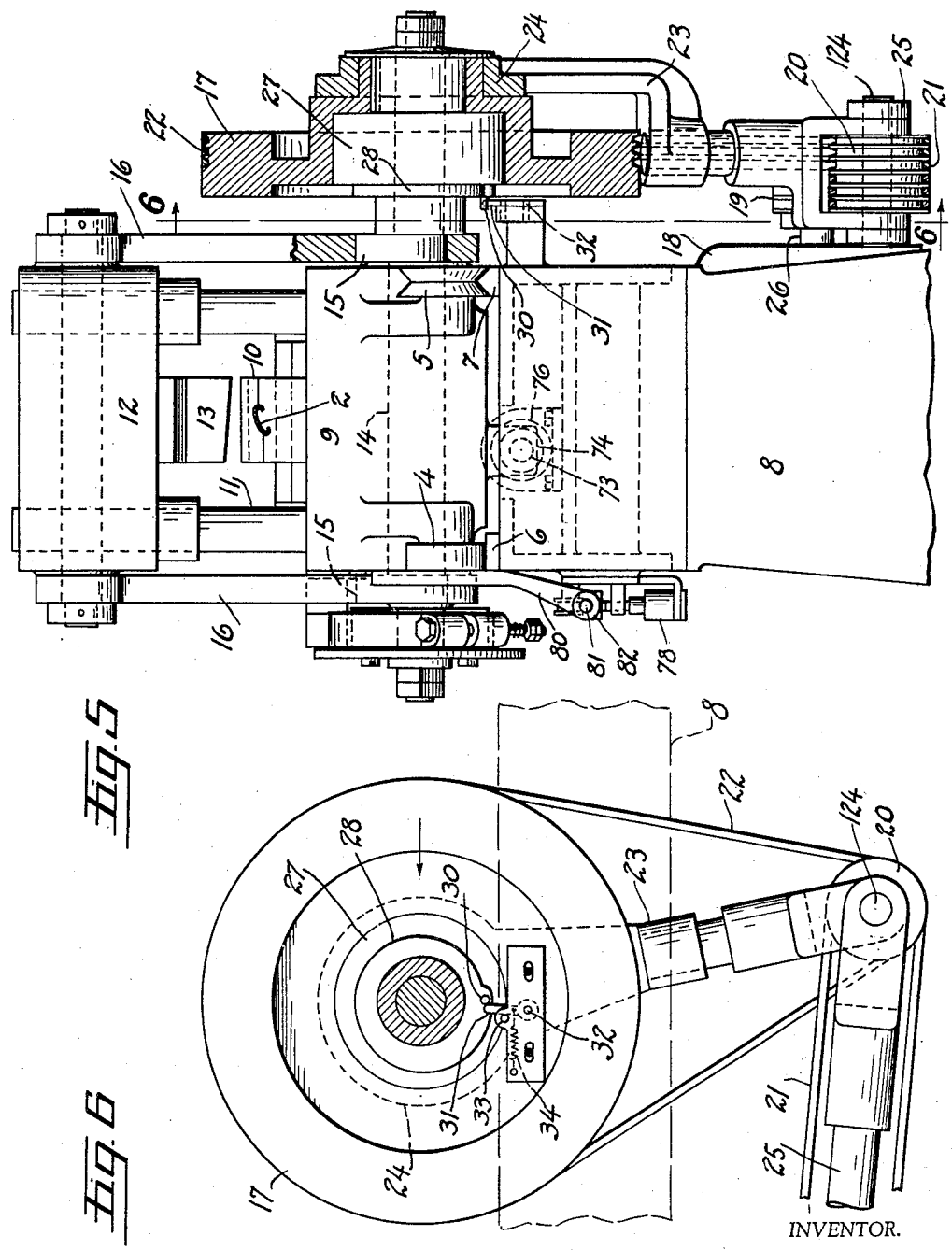

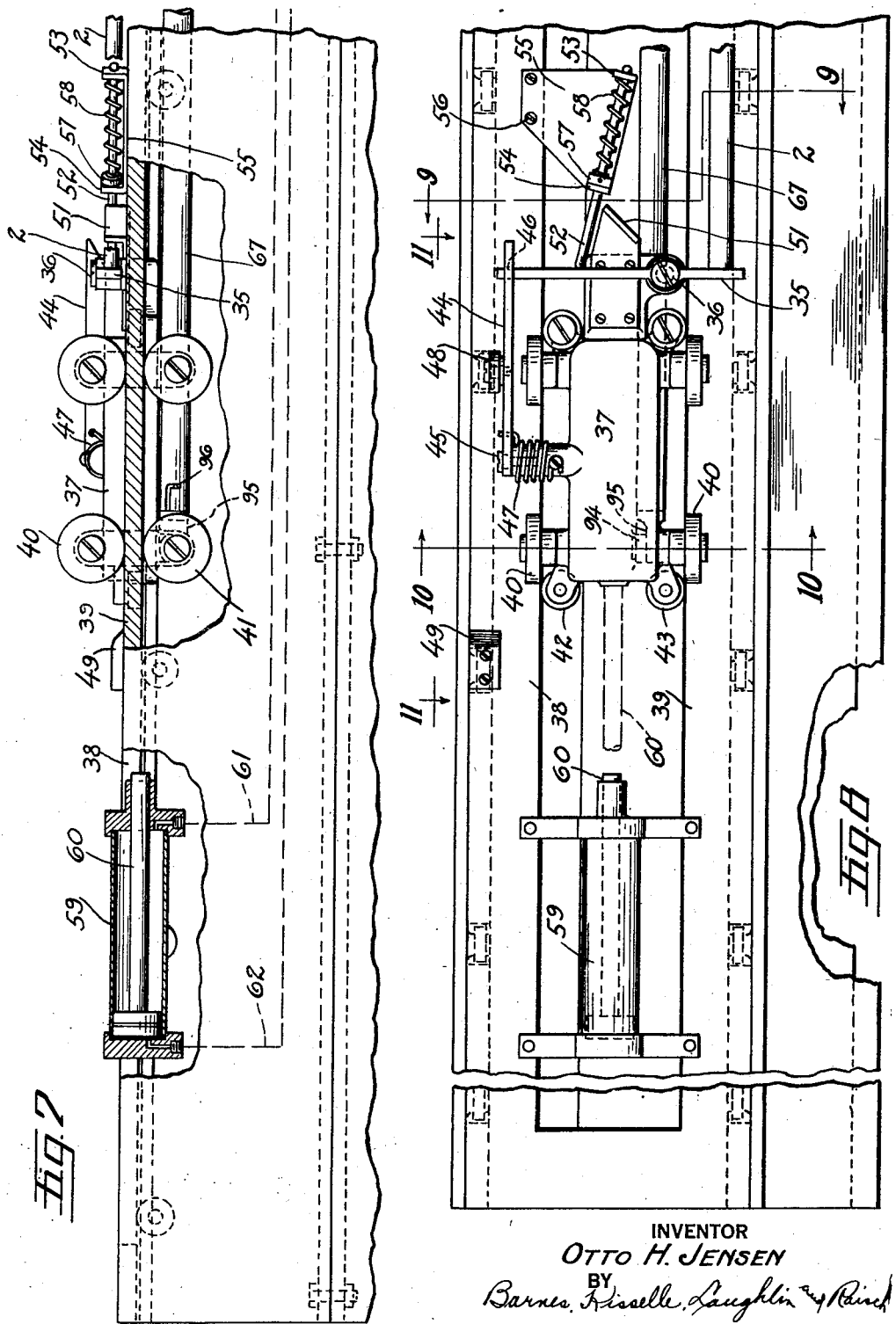

2,133,542

UNITED STATES PATENT OFFICE 2,133,542

CUT-OFF MACHINE

Otto H. Jensen, Detroit, Mich., assignor to Ternstedt Manufacturing Company, Detroit, Mich., a corporation of Michigan Application June 10, 1935, Serial No. 25,782

19 Claims. (Cl. 164—48)

This invention relates to a cut-off machine and more particularly to a cut-off machine for cutting a length of metal, such as a rolled section, or other stock into predetermined lengths. The invention relates specifically to a cut-off machine for automatically cutting into predetermined lengths a rolled metal section such as the garnish molding of a vehicle body as it is fed continuously to the cut-off machine from the rolling mill.

The purpose of the invention is to produce a more efficient cut-off machine than those heretofore known. In the type of cut-off machine with which this invention is concerned the work moving from the rolling mill is used to pick up the cut-off carriage from a standing start and accelerate it to the speed of the work preparatory to the cutting operation. Heretofore in this type of machine the impact of the moving work with the standing cutter carriage has in many instances peened over and otherwise distorted the end of the work and buckled the work thereby causing considerable wastage. This invention contemplates the prevention of this waste of the work material and achieves this result by an eased pick-up mechanism whereby the carriage for the cutter is picked up by the work slowly and the speed of the cutter carriage gradually increased until it attains the speed of the work just prior to the cutting operation.

In the drawings:

Fig. 1 is a side elevation of the cut-off machine showing the work being fed from the rolling mill into the cut-off machine before the work has picked up the cutter carriage.

Fig. 2 is a side elevation in detail of the cut-off carriage and associated pick-up mechanism.

Fig. 3 is a plan view partly in section of the cut-off carriage and delayed pick-up arrangement.

Fig. 4 is a detail of the eased pick-up mechanism after the cutter carriage has attained the speed of the work.

Fig. 5 is an end view partly in section showing the cutter carriage and clutch.

Fig. 6 is a section along the line 6—6 of Fig. 5.

Figs. 7 and 8 are a side elevation partly in section and a top plan view respectively of the work target and carriage therefor.

Fig. 9 is a section along the line 9—9 of Fig. 8.

Fig. 10 is a section along the line 10—10 of Fig. 8.

Fig. 11 is a view along the line 11—11 of Fig. 8.

Referring more particularly to the drawings there is a fragmentary showing of a rolling mill 1 into which is fed the work 2 which, in this case, is a flat metal strip which is rolled into a section such as shown in Fig. 5. The section shown is a section of a garnish molding such as is used for defining the window opening in a vehicle body. It is understood that the invention is not limited to a cut-off machine for rolled metal section such as shown but can be used for cutting lengths of metal or other material into predetermined lesser lengths and of tubular and various other types of cross section. The speed at which the work 2 is fed into the cut-off machine is determined by the speed of the rolling mill 1, but this speed will be varied depending upon the type of the work and the manner in which it is fed into the cut-off machine.

The cutter mechanism is shown in Figs. 1, 2, 3 and 5, and comprises a reciprocating carriage 3 supported by the wheels 4 and 5 which have a rolling engagement with the tracks 6 and 7 supported by the frame 8. The track 7 may be beveled for engagement with the circumferential V groove in the wheel 5 to insure rectilinear reciprocation of the carriage 3. The carriage 3 comprises a base 9 on which is fixed the female cutting die 10. The base 9 carries the upstanding posts 11 which reciprocably support the cutting head 12 which carries the knife 13. The base 9 also has journaled therein the drive crank shaft 14 having the cranks 15. The reciprocating head 12 is connected to the cranks 15 by the connecting rods 16 (Fig. 5). The crank shaft 14 has fixed thereon the flywheel pulley 17.

Power may be supplied to the fly-wheel pulley 17 from any source, such as the electric motor 18. The connection between the fly-wheel and the electric motor 18 may take the form of a pulley 19 mounted on the motor shaft which is connected to the intermediate pulley 20 by the belts 21 and the intermediate pulley 20 connected to the fly-wheel by the belts 22. Since the motor 18 is fixed to the underside of the cut-off frame 8 and the fly-wheel reciprocates along the frame 8 with the carriage 3, the intermediate pulley 20 must be mounted to permit this movement. This mounting may take the form of an arm 23 journaled on the hub 24 of the fly-wheel pulley 17 which carries a pintle 124 upon which the pulley 20 is mounted. A suitable arm 25 may be journaled at one end on the pintle 124 and at the other end upon the drive shaft 26 of the motor. The fly-wheel 17 is rotatably mounted on the crank shaft 14.

It is essential to the operation of this machine that the cutting head 12 and the knife 13 should make but one cutting stroke and return to its initial position each time it is set in operation. To this end any suitable clutch may be mounted on the crank shaft 14 for connecting the fly-wheel pulley 17 and the shaft 14 so that the cutting head 12 will make but one down stroke and one return stroke each time it is set in operation. This type of clutch is old and well-known in the art, having been used for years on punch presses, and consequently will not be described in detail.

The clutch for connecting the crank shaft 14 with the fly-wheel 17 may be shown generally comprising an external member 27 connected to the fly-wheel 17 and an internal member 28 connected to the crank shaft. The internal member carries a pin 30. A tripping finger 31 is pivotally mounted as at 32 on the side of the frame 8 (Figs. 5 and 6). This pivoted finger 31 is mounted to the rear of a stop pin 33 against which it is held by a spring 34 (Fig. 6). Thus, as the carriage 3 moves backwardly on its return stroke, the pin 30 swings the finger 31 clockwise (Fig. 6), but upon its forward stroke the finger 31 abuts the pin 33, and consequently resists the forward movement of the pin 30 causing the internal clutch mechanism 28 to rotate. This rotation of the internal mechanism 28 causes it to engage with the external mechanism 27 thus effecting a clutching engagement between the crank shaft 14 and the fly-wheel 17 which causes the cutting head 12 to make one cutting (down) and one return (up) stroke. This punch press type of clutch is arranged so that after once being engaged it will stay in engagement for one complete revolution of about 360°, thus returning the pin 30 back to the position shown in Fig. 6 where it will again be in position to strike the finger 31 upon the forward stroke of the carriage to again engage the clutch.

The work 2 is fed from the rolling mill 1, through the female die 10 into engagement with a target 35. The target and carriage therefor is shown in Figs. 7 and 8. The target 35 is pivotally mounted upon a reciprocating target carriage 37 by means of the pin 36. The target carriage 37 is reciprocably mounted upon the spaced tracks 38 and 39, and is provided with opposed top and bottom rollers 40 and 41 which engage the top and bottom faces respectively of the tracks 38 and 39. The carriage 37 is also provided with the rollers 42 and 43 which engage the inside faces of the track members 38 and 39 thereby guiding the carriage along a rectilinear pathway and prevent lateral shifting of the same. The rollers 40 and 41 by engaging the top and bottom faces of the track prevent up and down shifting of the target carriage 37.

A latch 44, pivoted to the carriage as at 45, is provided for the target 35. The latch 44 is provided with a notch 46 in which the target 35 engages the latch 44. As shown in Figs. 8 and 11, the latch 44 is provided with a torsion spring 47 which urges the same downwardly into engagement with the target. The latch 44 is also provided with a roller 48 which rotates about a horizontal axis and travels back and forth upon the trackway 38 during the reciprocation of the carriage 37. The trackway 38 is also provided with a cam member 49 which engages the roller 48 at the end of the forward stroke of the carriage 37 for purposes described below. The carriage 37 is provided with an obliquely positioned stop member 51 for the target 35.

For returning the target to operative position upon the return stroke of the target carriage 37 a plunger 52 is provided. This plunger 52 is reciprocably mounted in the upwardly turned ears 53 and 54 of the plate 55 which is secured by screws 56 to the track 38. The plunger 52 is provided with a shoulder 57 and a coil spring 58 is threaded upon the plunger 52 between the shoulder and the ear 53 thus urging the plunger 52 toward the left as viewed in Fig. 8.

An air cylinder 59 provided with a plunger 60 is fixed between the tracks 38 and 39. The air cylinder 59 is connected by suitable air lines 61 and 62 with the valve controlled air supply so that the plunger 60 will be projected into engagement with the carriage 37 as described below to return the carriage 37 and eased pick-up mechanism to its starting position.

Inasmuch as it is desired to continuously feed the work 2 into the cut-off machine, it is essential that the cutter travel with, and at the same rate of speed as, the work during the cutting operation. As above explained, the cutting knife and die are mounted upon the reciprocating carriage 3. It is proposed to have the moving work pick up the cutter carriage and to synchronize the speed of the carriage with that of the work. To achieve this end the inertia of the cutter carriage must be overcome. If this inertia is overcome abruptly, the end of the work upon abutting the target 35 will be bent and peened over or a considerable length of work between the cutter carriage and the target carriage may be buckled due to the compression causing a considerable amount of strip wastage. To avoid this wastage, it is proposed to provide a pick-up arrangement between the cutter and the moving work which will easily and gradually overcome the inertia of the cutter carriage and accelerate the movement of the same, preferably with a uniform acceleration, until the cutter and carriage attain the same speed as the work.

To achieve this end it is proposed to use a cutter carriage pick-up mechanism whereby force supplied by the moving work is applied through this pick-up mechanism with an initially great mechanical advantage which decreases as the speed of the cutter carriage increases and whereby a direct drive is effected as soon as the carriage attains a sufficient speed so that the shock incurred in shifting from the pick-up mechanism to direct drive will not injure the work.

This pick-up mechanism may, by way of example, take the form of a bell crank lever 65 pivotally mounted on pin 66 between the furcations of the lug 91 on the carriage 3. The target carriage 37 is connected to one end of the bell crank lever 65 by the draft rod 67. The bell crank 65 has pivoted to its upper end, as at 92, a short link 93. The under face of the carriage 37 is provided with a bifurcated lug 94 upon which is pivotally mounted a short link 95. As shown in Figs. 2 and 7, the draft link 67 is connected to the links 93 and 95 by a bayonet pin and slot connection 96. Inasmuch as the length of the draft rod 67 is determined by the length of the strips into which the work is to be severed, it is necessary to change the rod 67 for a different rod corresponding to the length of the strips into which the work is to be severed. This bayonet slot connection permits a ready substitution of one rod 67 for another.

The other end of the bell crank 65 is pivotally connected by pin 98 to a link 68 having a slot 69 through which a pin 70 is passed to connect the link 68 to the block 71 fixed on the frame 8 of the machine. The bottom 72 (Fig. 4) of the slot in lug 91 serves as an abutment against which both arms of the bell crank 65 abut to limit the swinging motion of this lever. The arms of the bell crank lever 65 are preferably positioned one relative to the other so that the angle between them is about 100°.

After the carriage 3 has been picked up and moved forwardly by the work 2, it must be returned to its initial position preparatory to the cutting of the next strip. The return of the carriage may be effected through a plunger 73, one end of which may engage the depending abutment 74 on the carriage 3 (Figs. 2 and 3) or the plunger 73 may be connected to act directly against draft link 67. The other end of the plunger is provided with a piston 75 reciprocably mounted in the cylinder 76. The cylinder 76 may be connected with a source of compressed air through the pipe lines 77 which are connected to, and controlled by, a Ross valve 78. The Ross valve is operated by a reciprocable cam 79. The cam 79 is reciprocated by a member 80 fixed to, and depending from, the carriage 3. The lower end of the member 80 has an eye through which the rod 81 is passed between the two blocks 82. The rod 81 is pivotally connected to the cam 79.

The operation of the machine is as follows: The starting position of the cutter carriage 13 and of the associated parts is shown in Figs. 1, 2 and 8. At this time the work 2 is traveling through the female member of the cutting die. The target 35 is in latched position extending laterally at right angles across the trackways 38 and 39. The reciprocable cam 79 for controlling the valve 78 is in its retracted position so that the compressed air is shut off from cylinders 76 and 59. The left-hand side of cylinder 76 in front of the piston is open to atmosphere. The work 2 passes into engagement with the target 35 thereby causing the target carriage 37 to move toward the left or in the direction of travel of the work. In those instances where the work is to be cut into long strips the trackway 39 serves as a support upon which the work slides in its forward travel. The target carriage 37 through draft link 67 swings the bell crank lever 65 in a counter-clockwise direction about its pivot 66. The pin 70 and link 68 permit fulcrum pin 98 to swing clockwise about pin 70 as a center but prevent rearward movement of pin 98, thus requiring pin 66 and the cutter carriage to move forward. It will be noted that during the initial movement of the bell crank lever 65 that the force applied thereto by the draft rod 67 travels at a much greater speed than the cutter carriage and that the force is applied over a much greater distance than any specified distance the carriage travels in the direction of the work during the initial stages of the pick-up. However, as the lever swings counter-clockwise the speed of the cutter carriage increases and approaches the speed of the draft rod 67, i. e., the speed at which the force is applied and at which the work travels.

Inasmuch as the initial mechanical advantage is high, the force required for setting the carriage 3 in motion is relatively small. As the work and the carriage travel forwardly or to the left the bell-crank lever 65 turns on its pivot 66 thus gradually decreasing the mechanical advantage until the carriage 3 attains the speed of the work. As the draft rod 67 applies its force to the bell crank 65 through pin 92 and rotates the same in a counterclockwise direction, the link 68 through its slot and pin connection with the fixed block 71 prevents the fulcrum 98 of the bell crank 65 from swinging rearwardly. Consequently, the pivot 66 and the cutter carriage must necessarily move forwardly or to the left. This movement continues until the bell crank seats against the abutment 72 at the bottom of the slot, at which time the link 68 has been pivoted to a substantially horizontal position so that as the carriage 3 moves forwardly the slot 69 permits the link 68 to slide forwardly along the pin 70.

Shortly after the carriage 3 attains the speed of the work 2, the lug 30 on the punch press type of clutch 27, 28, carried by the drive wheel 17 of the cutter, engages the finger 31 thus causing engagement of the clutch 27, 28, which motion is translated through the crank shaft 14, connecting rods 16 to the cutter head 12 causing the knife 13 to descend and sever the work.

As the target carriage 37 moves to the left, the cam 49 is positioned relative to the cutting operation of the work so that approximately as the work is cut the roller 48 rides up the cam 49. This swings the latch 44 upwardly to release the target 35. The oncoming uncut work engages the now severed strip and continues to move the same forwardly a short distance whereupon the cut strip is discharged laterally down the slide 100 from the track 39.

The depending rod 80 now moves the air control cam 79 to the position shown in Fig. 4 so that compressed air is admitted into the left-hand side of the cylinder 76, thus through the piston 75 and plunger 73, acting either through abutment 74 or draft link 67, returning the carriage 3 to the right or to its initial position. At the same time compressed air is admitted into cylinder 59 through line 62 to return the target carriage 37 to starting position. As the carriage 3 returns to its initial position, the draft link 67 returns the target carriage 37 to the right.

As the cutter carriage is returned to its starting position, as above described, compressed air is simultaneously admitted through line 62 into the cylinder 59. This projects the plunger 60 into engagement with the rear end of the carriage 37 to move the carriage 37 back to its initial or starting position. As the plunger 60 returns the carriage 37, inasmuch as the target 35 is unlatched, the target is readily swung about its pivot into engagement with stop 51 by the oncoming severed strip of garnish molding if it has not yet been discharged. This assists in throwing the severed strip of garnish molding sidewise off the track 39 on to the slideway 100. However, as soon as the target reaches the plunger 52, the target is swung counter-clockwise about its pivot back into latching engagement with the latch 44.

As soon as the cutter carriage 3 returns to its original position, the cam 79 operates the valve 78 to again shut off the compressed air from the cylinders 76 and 59. As the plunger 60 returns the target carriage 37 to its initial or starting position, it at the same time through the draft rod 67 returns the bell crank 65 clockwise about the pin 66 and thereby returns the bell crank and associated link 68 to initial or starting position. As stated above, the punch press clutch 27, 28, on the fly-wheel 17 makes but one revolution and then disengages. On the return stroke of the carriage the pin 30 swings readily by the finger 31 and passes to the rear of the same. The machine is now ready to repeat the cycle of operation above outlined.

From the above description it will be seen that the invention relates to a mechanism for cutting a moving length of work into shorter lengths in which the cutter mechanism is accelerated from a still position to the same speed as the work preparatory to the cutting operation by a pick-up mechanism characterized by the fact that the acceleration from the cutting mechanism is achieved gradually during a predetermined length of travel of the work and the force required at any time during the acceleration is insufficient to injure the work.

I claim:

1. A cut-off mechanism for cutting a continuously moving length of work into predetermined lengths comprising a cutting mechanism including a carriage movable along the line of travel of the work, a target positioned in the path of the work arranged to be engaged by the work and travel along the path of the work to propel said cutting mechanism along the path of the work preparatory to the cutting operation, and eased pick-up means including articulated connections movable relative to said carriage and connecting the said target with the movable cutting mechanism whereby when the target is engaged by, and moved along with, the moving work, the target and the eased pick-up means transmit the driving force of the work to the cutting mechanism with lost motion to set the cutting mechanism in motion along the line of travel of the work at an accelerating speed initially less than that of the work preparatory to the cutting operation.

2. A cut-off mechanism for cutting a continuously moving length of work into predetermined lengths comprising a cutting mechanism including a carriage movable along the line of travel of the work, a target positioned directly in the path of the work arranged to be engaged by the free end of the work and travel along the path of the work to propel said cutting mechanism along the path of the work preparatory to the cutting operation, eased pick-up means in the form of articulated connections including a lever movable relative to said cutting mechanism connecting the said target with the movable cutting mechanism with an initially high mechanical advantage to set the cutting mechanism in motion and with a gradually decreasing mechanical advantage to accelerate the speed of the movable cutting mechanism whereby the force of the moving work is transmitted through said target and eased pick-up means to propel said cutting mechanism along the line of travel of said work, and means for throwing off the eased pick-up means to effect a direct pull between the said target and the movable cutting mechanism.

3. A cut-off mechanism for cutting a continuously moving length of work into predetermined lengths comprising a cutting mechanism including a carriage movable along the line of travel of the work, a target positioned in the path of the work arranged to be engaged by the work and travel along the path of the work to propel the cutting mechanism along the line of travel of the work preparatory to the cutting operation, eased pick-up means connecting the said target with the movable cutting mechanism in the form of a draft link and articulated connection movable relative to said carriage whereby when the target is engaged by the end of the moving work and moved along therewith the draft link and connection transmit the driving force of the work to the cutting mechanism with lost motion to set the cutting mechanism in motion along the line of travel of the work at an accelerating speed initially less than that of the work.

4. A cut-off mechanism for cutting a continuously moving length of work into predetermined lengths comprising a cutting mechanism movable along the line of travel of the work, a target positioned in the path of the work arranged to be engaged by the work preparatory to the cutting operation, eased pick-up means connecting the said target with the movable cutting mechanism in the form of a draft link and connection whereby when the target is engaged by the moving work the draft link and connection transmit the driving force of the work to the cutting mechanism with lost motion to set the cutting mechanism in motion along the line of travel of the work at an accelerating speed initially less than that of the work, and means for throwing off the eased pick-up means when the cutting mechanism reaches a predetermined speed whereby the said target, draft link and connection pull the cutting mechanism directly at the same speed as the work preparatory to the cutting operation.

5. A cut-off mechanism for cutting a continuously moving length of work into predetermined lengths comprising a cutter and carriage therefor movable along the line of travel of the work, a target positioned in the path of the work arranged to be engaged by the work preparatory to the cutting operation, eased pick-up means connecting the said target with the cutter carriage in the form of a draft link and lever, one of which is connected to the target and the other of which is connected to the carriage whereby when the target is engaged by the moving work the driving force is applied to the cutter carriage with a mechanical advantage which gradually decreases to gradually accelerate the cutter carriage, and a stop against which the lever swings as the speed of the cutter carriage approaches that of the moving work whereby the work drives the cutter carriage directly through the target, draft link, and lever at the same speed as the work preparatory to the cutting operation.

6. A cut-off mechanism for cutting a continuously moving length of work into predetermined lengths comprising a cutter and carriage therefor movable along the line of travel of the work, a target positioned in the path of the work arranged to be engaged by the work preparatory to the cutting operation, eased pick-up means connecting the said target with the cutter carriage in the form of a draft link and lever pivotally connected, one of which is connected to the target and the other of which is connected to the carriage, the said lever having a shifting fulcrum whereby when the target is engaged by the moving work the driving force is applied to the cutter carriage with a mechanical advantage which gradually decreases to gradually accelerate the cutter carriage, and a stop against which the lever swings as the speed of the cutter carriage approaches that of the moving work whereby the work drives the cutter carriage directly through the target, draft link, and lever at the same speed as the work preparatory to the cutting operation.

7. A cut-off mechanism for cutting a continuously moving length of work into predetermined lengths comprising a cutter and carriage therefor movable along the line of travel of the work, a target positioned in the path of the work arranged to be engaged by the work preparatory to the cutting operation, eased pick-up means connecting the said target with the cutter carriage to move the same in the form of a draft link and a bell crank lever, the bell crank lever having one end pivotally connected to the draft link, the other end pivotally supported on a shiftable fulcrum and pivotally connected intermediate its ends to the cutter carriage, whereby when the target is engaged by the moving work the driving force is applied to the cutter carriage with a mechanical advantage which gradually decreases to gradually accelerate the speed of the cutter carriage, and a stop against which the bell crank lever swings as the speed of the cutter carriage approaches that of the moving work whereby the work drives the cutter carriage directly through the target, draft link and bell crank lever at the same speed as the work preparatory to the cutting operation.

8. A cut-off mechanism for cutting a continuously moving length of work into predetermined lengths comprising a cutting mechanism movable along the line of travel of the work, a target positioned in the path of the work arranged to be engaged by the work preparatory to the cutting operation, eased pick-up means connecting the said target with the cutter carriage in the form of a draft link and bell crank lever, the said draft link being pivotally connected at one end to the target and at the other end to an end of the bell crank lever, the said bell crank lever being pivotally mounted on the cutter carriage intermediate its ends, a movable fulcrum for the other end of the bell crank lever in the form of a link pivotally connected at one end to the bell crank lever and having a pin and slot connection with a fixed portion of the cut-off machine whereby when the target is engaged by the moving work the draft link and bell crank transmits the driving force of the work to the cutter carriage to move the same with a mechanical advantage which gradually decreases and accelerates the speed of the cutter carriage until it approaches that of the moving work, and a stop against which the bell crank lever abuts after the cutter carriage reaches a predetermined speed whereby the moving work drives the cutter carriage directly through the target, draft link, and bell crank.

9. A cut-off mechanism for cutting a continuously moving length of work into predetermined lengths comprising a cutting mechanism movable along the line of travel of the work, a target positioned in the path of the work arranged to be engaged by the work preparatory to the cutting operation, eased pick-up means connecting the said target with the cutter carriage in the form of a draft link and bell crank lever, the said draft link being pivotally connected at one end to the target and at the other end to an end of the bell crank lever, the said bell crank lever being pivotally mounted on the cutter carriage intermediate its ends, a movable fulcrum for the other end of the bell crank lever in the form of a link pivotally connected at one end to the bell crank lever and having a lost motion connection with a fixed portion of the cut-off machine whereby when the target is engaged by the moving work the draft link and bell crank transmits the driving force of the work to the cutter carriage to move the same with a mechanical advantage which gradually decreases and accelerates the speed of the cutter carriage until it approaches that of the moving work, and a stop against which the bell crank lever abuts after the cutter carriage reaches a predetermined speed whereby the moving work drives the cutter carriage directly through the target, draft link, and bell crank.

10. A cut-off mechanism for cutting a continuously moving length of work into predetermined lengths comprising a cutting mechanism movable along the line of travel of the work, a target positioned in the path of the work arranged to be engaged by the work preparatory to the cutting operation, eased pick-up means connecting the said target with the cutter carriage in the form of a draft link and bell crank lever, the said draft link being pivotally connected at one end to the target and at the other end to an end of the bell crank lever, the said bell crank lever being pivotally mounted on the cutter carriage intermediate its ends, a movable fulcrum for the other end of the bell crank lever in the form of a link pivotally connected at one end to the bell crank lever and having a lost motion connection with a fixed portion of the cut-off machine, the said link and arm of the bell crank lever to which the link is connected forming a toggle which breaks downwardly during the eased picking up of the cutter carriage whereby when the target is engaged by the moving work the draft link and bell crank transmits the driving force of the work to the cutter carriage to move the same with a mechanical advantage which gradually decreases and accelerates the speed of the cutter carriage until it approaches that of the moving work, and a stop against which the bell crank lever abuts after the cutter carriage reaches a predetermined speed whereby the moving work drives the cutter carriage directly through the target, draft link, and bell crank.

11. A cut-off mechanism for cutting a continuously moving length of work into predetermined lengths comprising a cutting mechanism movable along the line of travel of the work, a target positioned in the path of the work arranged to be engaged by the work preparatory to the cutting operation, eased pick-up means connecting the said target with the cutter carriage in the form of a draft link and bell crank lever, the said draft link being pivotally connected at one end to the target and at the other end to an arm of the bell crank lever, the said arm being positioned substantially vertically when movement of the cutter carriage is initiated, the said bell crank lever being pivotally mounted on the cutter carriage intermediate its ends, a movable fulcrum for the other end of the bell crank lever in the form of a link pivotally connected at one end to the bell crank lever and having a lost motion connection with a fixed portion of the cut-off machine, the said link and arm of the bell crank lever to which the link is connected forming a toggle which breaks downwardly during the eased picking up of the cutter carriage whereby when the target is engaged by the moving work the draft link and bell crank transmits the driving force of the work to the cutter carriage to move the same with a mechanical advantage which gradually decreases and accelerates the speed of the cutter carriage until it approaches that of the moving work, and a stop against which the bell crank lever abuts after the cutter carriage reaches a predetermined speed whereby the moving work drives the cutter carriage directly through the target, draft link, and bell crank.

12. In a cut-off machine for cutting a continuously moving length of work into predetermined lengths comprising a frame, a cutter and cutter carriage therefor movable upon the frame along the line of travel of the work, a target and carriage therefor movably supported upon the said frame in the path of the work and arranged to be engaged by the moving work to propel the cutter carriage along the line of travel of said work preparatory to the cutting operation, eased pick-up means including articulated connections movable relative to said cutter carriage connecting the target and carriage with the movable cutter carriage whereby when the target is engaged by the moving work the eased pick-up means transmits the driving force of the work from the target to the cutter carriage with lost motion to set the cutter carriage in motion from a standing start along the line of travel of the work at an accelerating speed initially less than that of the work preparatory to the cutting of the work by the said cutter, and means for returning the cutter and target carriages to their initial starting position after the work has been cut.

13. In a cut-off machine for cutting a continuously moving length of work into predetermined lengths comprising a frame, a cutter and cutter carriage therefor movable upon the frame along the line of travel of the work, a releasable target movably supported for movement along the said frame directly in the path of the work and arranged to be engaged by the free end of the moving work to propel the cutter carriage along the line of travel of said work preparatory to the cutting operation, eased pick-up means including articulated connections movable relative to said cutter carriage connecting the releasable target and carriage with the movable cutter carriage whereby when the releasable target is engaged by the moving work the eased pick-up means transmits the driving force of the work from the target to the cutter carriage with lost motion to set the cutter carriage in motion from a standing start along the line of travel of the work at an accelerating speed initially less than that of the work preparatory to the cutting of the work by the said cutter, means for releasing the releasable target from engagement with the work after the cutting operation, and means for returning the cutter carriage and releasable target to their initial starting position.

14. In a cut-off machine for cutting a continuously moving length of work into predetermined lengths comprising a frame, a cutter and cutter carriage therefor movable upon the frame along the line of travel of the work, a pivoted target movably supported for movement along the said frame in the path of the work and arranged to be engaged by the moving work preparatory to the cutting operation, a latch for latching the pivoted target, eased pick-up means connecting the pivoted target and carriage with the movable cutter carriage whereby when the pivoted target is engaged by the moving work the eased pick-up means transmits the driving force of the work to the cutter carriage with lost motion to set the cutter carriage in motion from a standing start along the line of travel of the work at an accelerating speed initially less than that of the work preparatory to the cutting of the work by the said cutter, a cam for releasing the latch whereby the work after the cutting operation swings the target out of the path of travel of the work, and means for returning the cutter carriage and pivoted target to their initial starting position.

15. A cut-off mechanism for cutting a continuously moving length of work into predetermined lengths comprising a cutting mechanism movable along the line of travel of the work, a target initially positioned in the path of the work a distance from the cutting mechanism less than the predetermined length into which the work is to be cut arranged to be engaged by the work preparatory to the cutting operation, eased pick-up means connecting the said target with the movable cutting mechanism with an initially high mechanical advantage to set the cutting mechanism in motion and with a gradually decreasing mechanical advantage to accelerate the speed of the movable cutting mechanism, and means for throwing off the eased pick-up means after the target reaches a position in the path of the work a distance from the cutter mechanism equal to the predetermined length into which the work is to be cut to effect a direct pull between the said target and the movable cutting mechanism.

16. A cut-off mechanism for cutting a continuously moving length of work into predetermined lengths comprising a cutting mechanism movable along the line of travel of the work, a target initially positioned in the path of the work a distance from the cutting mechanism less than the predetermined length into which the work is to be cut arranged to be engaged by the work preparatory to the cutting operation, eased pick-up means connecting the said target with the movable cutting mechanism in the form of a draft link and connection whereby when the target is engaged by the moving work the draft link and connection transmit the driving force of the work to the cutting mechanism with lost motion to set the cutting mechanism in motion along the line of travel of the work at an accelerating speed initially less than that of the work, and means for throwing off the eased pick-up means after the target reaches a position in the path of the work a distance from the cutter mechanism equal to the predetermined length into which the work is to be cut and when the cutting mechanism reaches a predetermined speed whereby the said target, draft link and connection pull the cutting mechanism directly at the same speed as the work preparatory to the cutting operation.

17. A cut-off mechanism for cutting a continuously moving length of work into predetermined lengths comprising a cutting mechanism movable along the line of travel of the work, a target positioned in the path of the work arranged to be engaged by the work preparatory to the cutting operation, eased pick-up means connecting the said target with the cutter carriage in the form of a draft link and bell crank lever, the said draft link being pivotally connected at one end to the target and at the other end to an end of the bell crank lever, the said bell crank lever being pivotally mounted on the cutter carriage intermediate its ends, a movable fulcrum for the other end of the bell crank lever in the form of a link pivotally connected at one end to the bell crank lever and having a pin and slot connection with a fixed portion of the cut-off machine whereby when the target is engaged by the moving work the draft link and bell crank transmits the driving force of the work to the cutter carriage to move the same with a mechanical advantage which gradually decreases and accelerates the speed of the cutter carriage until it approaches that of the moving work, and a stop against which the bell crank lever abuts after the cutter carriage reaches a predetermined speed whereby the moving work drives the cutter carriage directly through the target, draft link, and bell crank, the length of the connection between the target and the cutter carriage being initially such that the target is spaced from the cutter knife a distance shorter than the length into which the work is to be cut and such distance gradually increases prior to the cutting operation until it equals the predetermined length of the piece into which the work is to be cut and is unchangeable during the cutting operation.

18. A cut-off mechanism for cutting a continuously moving length of work into predetermined lengths comprising a cutting mechanism movable along the line of travel of the work, a target positioned in the path of the work arranged to be engaged by the work preparatory to the cutting operation, eased pick-up means connecting the said target with the cutter carriage in the form of a draft link and bell crank lever, the said draft link being pivotally connected at one end to the target and at the other end to an end of the bell crank lever, the said bell crank lever being pivotally mounted on the cutter carriage intermediate its ends, a movable fulcrum for the other end of the bell crank lever in the form of a link pivotally connected at one end to the bell crank lever and having a lost motion connection with a fixed portion of the cut-off machine whereby when the target is engaged by the moving work the draft link and bell crank transmits the driving force of the work to the cutter carriage to move the same with a mechanical advantage which gradually decreases and accelerates the speed of the cutter carriage until it approaches that of the moving work, and a stop against which the bell crank lever abuts after the cutter carriage reaches a predetermined speed whereby the moving work drives the cutter carriage directly through the target, draft link, and bell crank, the length of the connection between the target and the cutter carriage being initially such that the target is spaced from the cutter knife a distance shorter than the length into which the work is to be cut and such distance gradually increases prior to the cutting operation until it equals the predetermined length of the piece into which the work is to be cut and is unchangeable during the cutting operation.

19. A cut-off mechanism for cutting a continuously moving length of work into predetermined lengths comprising a cutter and carriage therefor movable along the line of travel of the work, a target positioned in the path of the work arranged to be engaged by the work preparatory to the cutting operation, eased pick-up means connecting the said target with the cutter carriage in the form of a draft link and lever, one of which is connected to the target and the other of which is connected to the carriage whereby when the target is engaged by the moving work the driving force is applied to the cutter carriage with a mechanical advantage which gradually decreases to gradually accelerate the cutter carriage, and a stop against which the lever swings as the speed of the cutter carriage approaches that of the moving work whereby the work drives the cutter carriage directly through the target, draft link, and lever at the same speed as the work preparatory to the cutting operation, the length of the connection between the target and the cutter carriage being initially such that the target is spaced from the cutter knife a distance shorter than the length into which the work is to be cut and such distance gradually increases prior to the cutting operation until it equals the predetermined length of the piece into which the work is to be cut and is unchangeable during the cutting operation.

OTTO H. JENSEN.